United States Patent

Schopf

[11] Patent Number: 5,553,563
[45] Date of Patent: Sep. 10, 1996

[54] SEWING MACHINE WITH ROTARY STITCH REGULATOR

[75] Inventor: Dieter Schopf, Gerlingen, Germany

[73] Assignee: Union Special GmbH, Germany

[21] Appl. No.: 373,624

[22] Filed: Jan. 17, 1995

[30] Foreign Application Priority Data

Jan. 20, 1994 [DE] Germany .................. 44 01 551.8

[51] Int. Cl.⁶ ........................................ D05B 27/02
[52] U.S. Cl. ............................ 112/315; 112/323
[58] Field of Search ........................... 112/315, 323, 112/324

[56] References Cited

U.S. PATENT DOCUMENTS

| 1,055,584 | 3/1913 | Weis | 112/323 |
|---|---|---|---|
| 1,148,446 | 7/1915 | De Voe | 112/323 |
| 1,176,444 | 3/1916 | Hagelstein | 112/323 |
| 1,763,952 | 6/1930 | Christensen et al. | 112/323 |
| 1,817,727 | 8/1931 | Wohlpart | 112/323 |
| 2,643,625 | 6/1953 | Reimer | 112/315 |
| 4,462,325 | 7/1984 | Motta et al. | 112/315 |

FOREIGN PATENT DOCUMENTS 1209487  3/1960  France ............................ 112/323

Primary Examiner—Ismael Izaguirre
Attorney, Agent, or Firm—Brinks Hofer Gilson & Lione

[57] ABSTRACT

A sewing machine including a stitch length regulator that adjusting the extent of the horizontal movement of the feed dog. The stitch length regulator is operated by rotation and includes an eccentric that is disposed on a rotating shaft. The eccentric is radially adjustable relative to the rotating shaft by rotating a threaded spindle with a manual tool such as a screw driver.

2 Claims, 3 Drawing Sheets

SEWING MACHINE WITH ROTARY STITCH REGULATOR

BACKGROUND OF THE INVENTION

The invention relates to a sewing machine having a device for adjusting the horizontal movement or transportation distance of the feed dog by virtue of a rotatory stitch length regulator which has a continuous adjustment and includes an eccentric. The stitch length regulator is disposed on a rotating shaft and is connected to and drives the feed dog.

U.S. Pat. No. 2,643,625 discloses a sewing machine, in which a rotating shaft has an inner eccentric that is surrounded by an outer eccentric. The inner eccentric rotates with respect to the rotating shaft, whereas the outer eccentric rotates with the shaft. Although this arrangement renders it possible to change the degree of eccentricity of the outer eccentric in relation to the shaft axis, it is necessary when carrying out the adjustment to fixedly hold the inner eccentric while the shaft is rotated. Thus, adjustment is difficult, time consuming, requires special tools and is cumbersome.

For the foregoing reasons, there is a need for a sewing machine in which the stitch length can be adjusted by a simple manual adjustment using a common hand tool.

SUMMARY OF THE INVENTION

The present invention is directed to an apparatus that satisfies the need for a sewing machine in which the stitch length can be adjusted quickly and easily through the use of a common hand tool. The apparatus comprises a sewing machine including a stitch length regulator that adjusts the extent of the horizontal movement of the feed dog. The stitch length regulator is rotary operated and includes an eccentric that is disposed about a rotating shaft. The eccentric is radially adjustable relative to the rotating shaft by rotating a screw with a manual tool such as a screw driver.

The object of the invention is thus to provide a convenient rotary stitch length regulator to adjust the stitch length of the workpiece feed device.

This object is achieved by virtue of a threaded rotary spindle that engages the inner thread of an eccentric. The rotary spindle can be screwed in and out for the purpose of radially displacing the eccentric which renders it possible in a convenient manner, for example by means of a screw driver, to adjust the stitch length.

DETAILED DESCRIPTION OF THE PREFERRED EMBODIMENT

Figure 1:
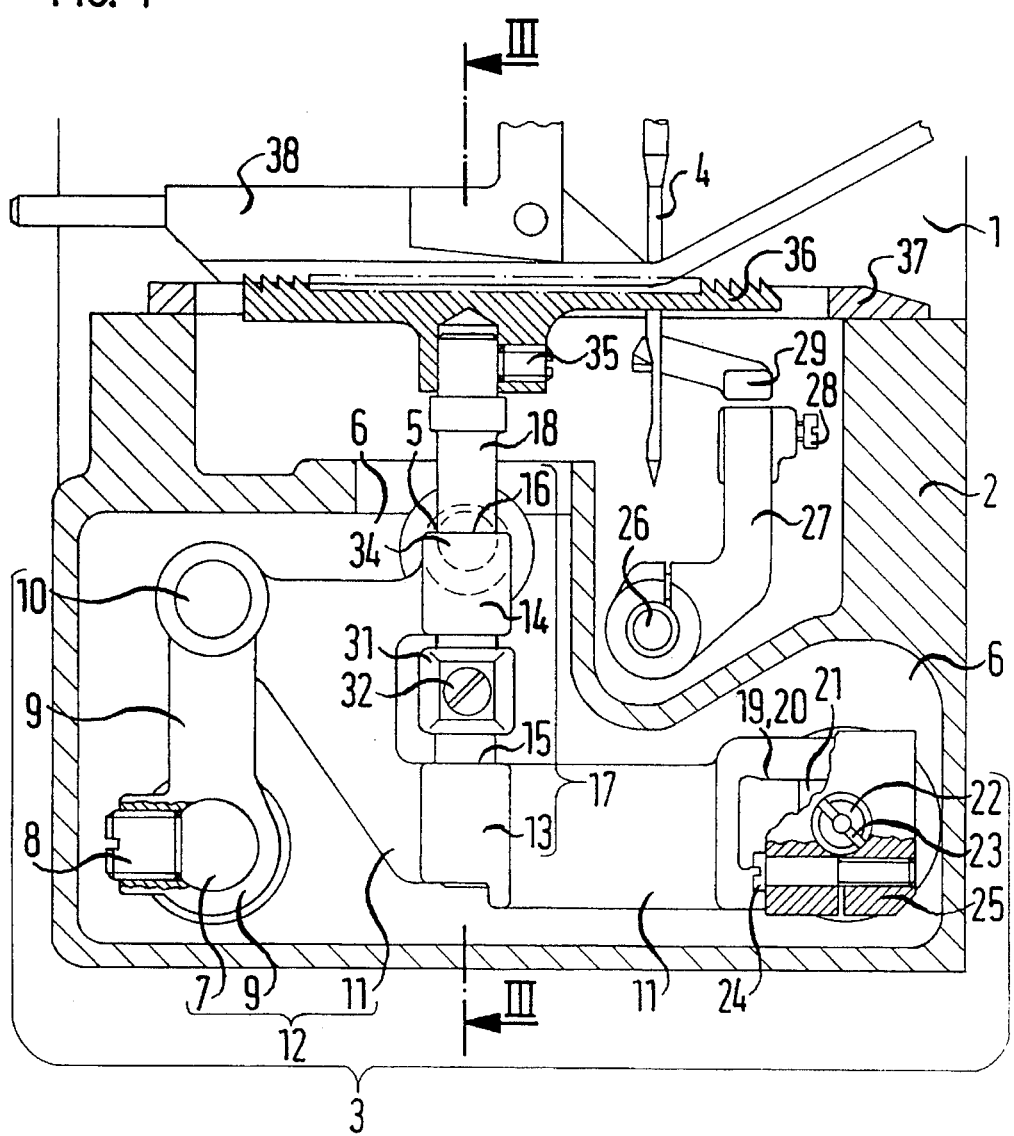
FIG. 1 is a partially broken away front view of the lower portion of a sewing machine including a workpiece feed device comprising a feed dog.

FIG. 1 illustrates a part of a sewing machine 1 having a lower part 2, in which is mounted a workpiece feed device 3 which carries out a lift and feed movement. FIG. 1 includes a sewing machine needle 4 which serves to orientate and clarify the illustration of the workpiece feed device 3. The workpiece feed device 3 functions as the lower transportation device for advancing the workpiece during the sewing operation. A rotating shaft 5 is journaled for rotation in an intermediate plate 6 of the lower part 2 and is driven by a motor (not illustrated in the drawing). An oscillating shaft 7 is also journaled in the intermediate plate 6. The oscillating shaft 7 carries a forked oscillating crank arm 9 which is attached by means of a screw 8 and which carries at its fork end a journal shaft 10, by means of which a feed frame 11 is articulated on the oscillating crank 9. The oscillating shaft 7, forked oscillating crank arm 9 and feed frame 11 are part of a feed drive 12.

The feed frame 11 includes hubs 13 and 14 having cylindrical openings 15 and 16 formed therein, which function as a slide guide for a lifting rod 18.

The feed frame 11 is guided at one end by the oscillating crank arm 9 and the journal shaft 10 and includes at its other end a guide 19 having a fork 20, which encompasses in a slidable manner a block 21. The block 21 is mounted on a journal 22 which is disposed in an eccentric manner and which journal is disposed in its left end position and comprises an adjustment slot 23. A claw piece 25 attached by a screw 24 encompasses the journal 22 and in addition laterally guides the feed frame 11.

A looper shaft 26 carries a looper holder 27 which is attached by means of a screw 28 a looper 29 which cooperates with the sewing machine needle 4.

The lifting rod 18 carries a clamping piece 31, which is attached thereto by means of a screw 32. The clamping piece 31 is drivingly connected by an eccentric 34 to the shaft 5. The upper free end of the lifting rod 18 is attached by means of a screw 35 a feed dog 36, also known as a workpiece feeder, which protrudes through a throat plate 37, when the eccentric 34 is disposed as shown in FIG. 1 in its upper position. A pressure foot 38 cooperates with the feed dog 36 and the throat plate 37 to impart intermittent forward feed to the workpiece (not illustrated in the drawing).

Figure 2:
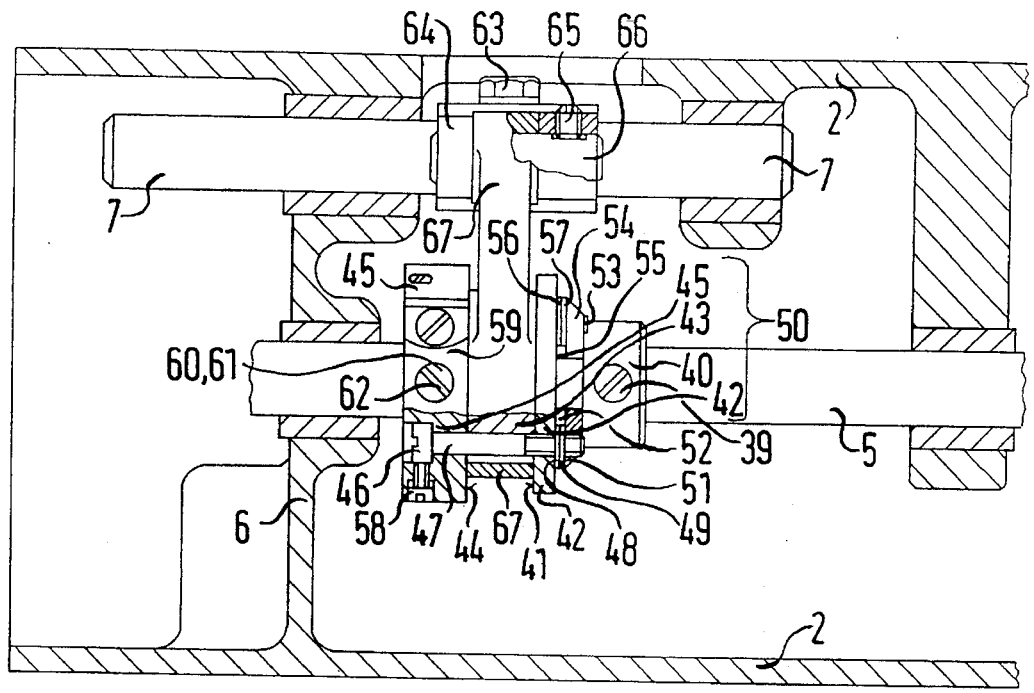
FIG. 2 is a broken away plan view of the lower portion of a sewing machine with a rotatory stitch length regulator.

FIG. 2 is a cross sectional top view of the lower part 2. Attached to the shaft 5 by means of a screw 39 is a collar 40, to which is connected a flange 42 that has an end face 41. A radially displaceable eccentric 43 and an annular body 45 are attached to the shaft 5. The annular body 45 includes an end face 44 that is axially adjacent to the flange 42. A screw 47 having a cylindrical head 46 penetrates the annular body 45, eccentric 43 and the flange 42 and carries at its free end that extends outwardly from the flange 42 conical spring washers 48 and 49. The collar 40, its flange 42, the eccentric 43 and the annular body 45 are all part of the rotating stitch length regulator 50.

The screw 47 is disposed by means of a nut 51, which is form-locking, i.e. secured against rotation, in a pocket 52 of the collar 40 and is biased by means of the two spring washers 48 and 49. An additional screw 53, having a head 91, is biassed by a nut 54, which is disposed in a pocket 55 of the collar 40, as well as by means of two conical spring washers 56 and 57. Consequently, a frictional force acts by way of the end faces 41 and 44 on the eccentric 43. The cylindrical head 46 of the screw 47 is secured by means of a screw 58 against rotation. The annular body 45 supports a cover 59, below which a screw 60 is rotatably carried by the annular body 45. Screw 60 has a screw head 61 with an adjustment slot 62 formed therein.

The oscillating shaft 7 carries another forked oscillating crank 64, which is attached by means of a screw 63 and which has at its forked end a journal shaft 66 that is attached by a screw 65. One end of a connecting rod 67 is articulated on journal shaft 66 and its other end is articulated about eccentric 43.

Figure 3:
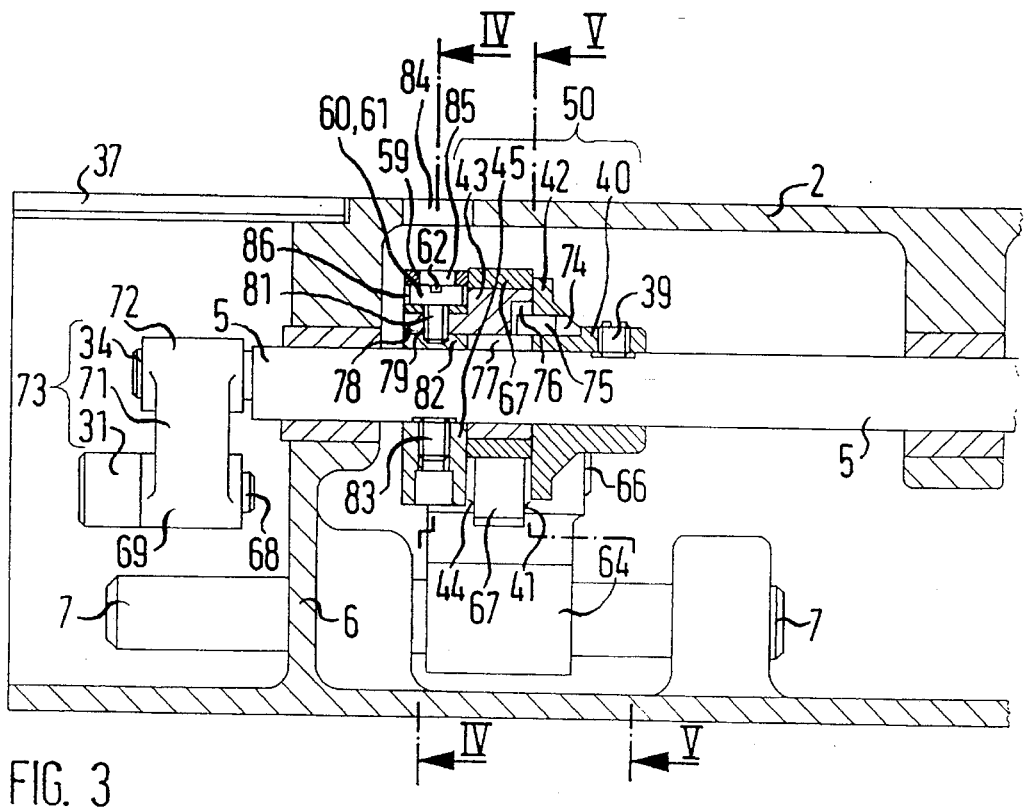
FIG. 3 is a sectional view, taken along lines III—III of FIG. 1, of the lower portion of a sewing machine with a rotating stitch length regulator.

As shown in FIG. 3 there is shown, a connecting rod 71 that has a hub 69 at one end and another hub 72 at its other end. The hub 69 has a cylindrical bore formed therein that receives a journal shaft 68 having a clamping piece 31 through which the connecting rod 71 is pivotally mounted on the journal shaft 68. The other hub 72 of the connecting rod 71 encompasses the eccentric 34. The eccentric 34, the connecting rod 71 and the clamping piece 31 are part of the lifting drive 73.

A pin 75 is attached in the flange 42 in an opening 74, which pin is disposed parallel with the shaft 5 and protrudes into a groove 76 formed in the eccentric 43 and disposed perpendicular to the shaft 5. The eccentric 43 has an elongated hole 77 formed therein, which surrounds the shaft 5. The elongated hole 77 renders it possible to radially displace the eccentric 43, which as seen in FIG. 3 is in its upper position. This position makes possible the maximum stitch length of the workpiece feed device 3.

Figure 4:
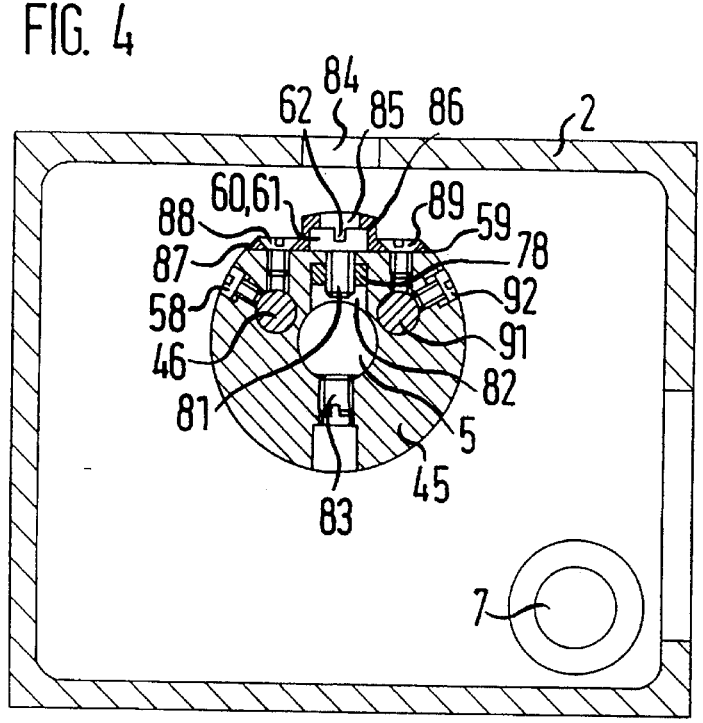
FIG. 4 is a sectional view, taken along lines IV—IV of FIG. 3.

Referring now to FIG. 4 for a discussion of the adjustment of eccentric 43 through its shoulder 78 by the spindle 81. The cover 59 is attached at a flattened portion 87 of the annular body 45 by means of a screw 88 and 89 respectively. A screw head 91 of the screw 53 is secured by a screw 92 against rotation.

A flat shoulder member 78 extends laterally from the eccentric 43. The flat shoulder 78 has a bore with inner threads 79, that can receive a threaded spindle 81, i.e. the threaded shank of the screw 60. The flat shoulder 78 protrudes into a groove 82 formed in the annular body 45. The annular body is attached by a screw 83 to the shaft 5.

The lower part 2 has an opening 84 formed therein, below which is located another opening 85 that is formed in the cover 59. These openings 84 and 85 render it possible by means of a screw driver (not illustrated in the drawing) that engages the adjustment slot 62 formed in the screw head 61 of the screw 60. The screw head 61 is axially positioned in a groove 86 formed in the cover 59, so that when the screw 60 is rotated its threaded spindle 81 engages the inner threads 79 of the flat shoulder 78 and thus causes the eccentric 43 to be moved radially with respect to the shaft 5.

Figure 5:
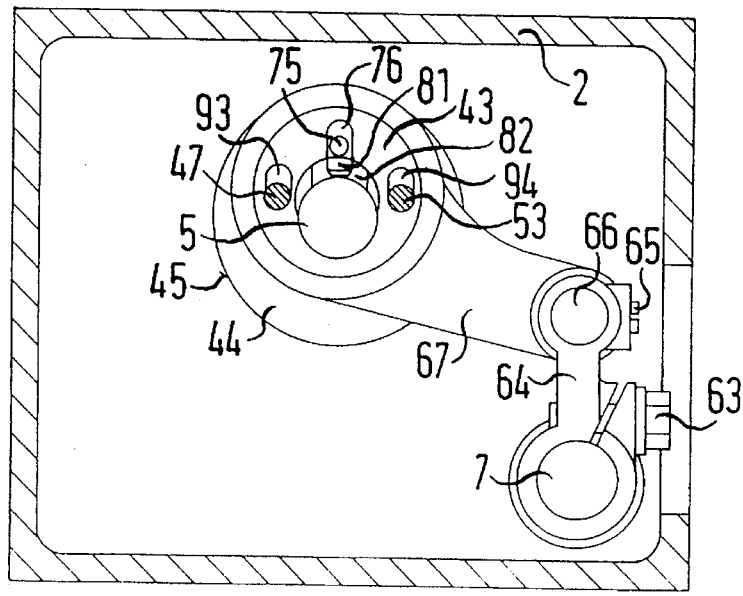
FIG. 5 is a sectional view taken along lines V—V of FIG. 3.

FIG. 5 illustrates the eccentric 43 encompassed in an articulated manner by the connecting rod 67. The eccentric 43 includes an elongated hole 93, through which protrudes the screw 47, and an elongated hole 94, through which protrudes the screw 53. The elongated holes 93 and 94 render it possible to displace the eccentric 43 radially.

The horizontal movement or throw transportation distance of the feed dog 36 and of the eccentric 43 is adjusted in the following manner. A screw driver (not illustrated in the drawing) is inserted through the openings 84 and 85 such that it engages in the adjustment slot 62 of the screw head 61 or screw 60. By manually turning the screw driver the threaded spindle 81 of screw 60 can be rotated. Rotating the spindle 81, the preferred embodiment of which has a right-hand thread, in a counter-clockwise direction, causes the flat shoulder 78 of the eccentric 43 to be pushed towards the shaft 5 and consequently the eccentricity of the eccentric 43 relative to the axis of the shaft 5 is reduced. This reduces the length of the stitch of the sewing machine and of the horizontal movement or transportation distance of the feed dog 36. As a result of the frictional force, which is caused by the spring washers 48, 49, 56 and 57 and acts laterally on the eccentric 43, the said eccentric is additionally secured in its adjusted operative position.

It is intended that the accompanying Drawings and foregoing detailed description is to be considered in all respects as illustrative and not restrictive, the scope of the invention is intended to embrace any equivalents, alternatives, and/or modifications of elements that fall within the spirit and scope of the invention, and all changes which come within the meaning and range of equivalency of the claims are therefore intended to be embraced therein.

What is claimed is:

1. A sewing machine of the type having an adjustable, rotating stitch length regulator, disposed on a rotating shaft, for adjusting the horizontal movement of the feed dog comprising an eccentric that is connected to and drives the feed dog, wherein the improvement comprises:

said eccentric being disposed around and radially adjustable relative to said rotating shaft;

said eccentric having an axially extending shoulder member that has an internally threaded bore formed therein;

a threaded spindle supported for rotary movement on said rotating shaft such that it is in threaded engagement with said internally threaded bore;

a flange having an end face is secured to said rotating shaft;

an annular body disposed around said rotating shaft and having an end face; and said eccentric being located between and in sliding contact with the end face of said annular body and said end face of said flange such that as it is radially adjusted in it is guided by and in frictional engagement with said end faces.

2. A sewing machine according to claim 7, wherein the improvement further comprises:

aligned holes, extending parallel to said rotating shaft, formed in said eccentric, annular body and flange;

screws extending through said aligned holes; and spring washers carried by said screws for applying a frictional force between said end faces and said eccentric.

* * * * *